United States Patent [19]

Kim et al.

[11] Patent Number: 5,621,168

[45] Date of Patent: Apr. 15, 1997

[54] SIMULATOR FOR TESTING AN ABS MODULATOR

[75] Inventors: Sang K. Kim; Hong J. Lee, both of Seoul, Rep. of Korea

[73] Assignee: Daewoo Electronics Co., Ltd., Seoul, Rep. of Korea

[21] Appl. No.: 493,304

[22] Filed: Jun. 21, 1995

[30] Foreign Application Priority Data

Jun. 22, 1994 [KR] Rep. of Korea .................. 94-14133

[51] Int. Cl.⁶ ........................................ G01L 5/28
[52] U.S. Cl. ...................................... 73/123; 73/126
[58] Field of Search ........................ 73/121, 123, 124, 73/125, 126, 132

[56] References Cited

U.S. PATENT DOCUMENTS

| | | | |
|---|---|---|---|
| 3,905,225 | 9/1975 | Moss et al. | 73/117 |
| 3,982,429 | 9/1976 | Cline | 73/126 |
| 4,050,299 | 9/1977 | Maxwell | 73/126 |
| 4,520,444 | 5/1985 | Koos | 73/126 |
| 4,986,114 | 1/1991 | Rothmann et al. | 73/126 |
| 5,339,682 | 8/1994 | Watanabe et al. | 73/123 |
| 5,450,748 | 9/1995 | Evans et al. | 73/123 |

FOREIGN PATENT DOCUMENTS

| | | |
|---|---|---|
| 0507631A1 | 10/1992 | European Pat. Off. . |
| 4028561A1 | 3/1992 | Germany . |

OTHER PUBLICATIONS

Abstract of German patent no DE 40 28 561 A1 dated Mar. 12, 1992.
European Search Report dated Apr. 10, 1996.

*Primary Examiner*—Richard Chilcot
*Assistant Examiner*—Eric S. McCall
*Attorney, Agent, or Firm*—Fish & Richardson P.C.

[57] ABSTRACT

A simulator for testing an Anti-lock braking system modulator capable of easily setting the yawing of a vehicle and disproportionate concentration of a vehicle weight according to the various vehicle weights and diverse road surface conditions has wheels rotated by compressively contacting flywheel pairs, a flywheel driving portion for transmitting and managing a driving force to the flywheels, rotation-speed sensors for monitoring the rotational speed of the wheels and flywheels, pneumatic cylinders installed to respective wheels for regulating a frictional force between the wheels and flywheels, a braking system for inciting a braking force to the wheels to which a modulator to be tested is mounted, a pneumatic pressure generating circuit for supplying a predetermined pressure to the braking system and pneumatic cylinder, and a controller electrically connected to the flywheel driving portion, rotation-speed sensors and pneumatic pressure generating circuit, in which the controller controls the flywheel driving portion to permit the flywheel pairs to have the identical or different rotational speed responsive to an input signal from the rotation-speed sensors, outputs a control signal to the pneumatic pressure generating circuit, provides the identical or different pneumatic pressure to the pneumatic cylinders respectively connected to the wheels, and operates the braking system.

8 Claims, 3 Drawing Sheets

SIMULATOR FOR TESTING AN ABS MODULATOR

BACKGROUND OF THE INVENTION

1. Field of the Invention

The present invention relates to a simulator for testing an anti-lock braking system (hereinafter simply referred to as "ABS"), and more particularly to a simulator for testing an ABS modulator capable of simulating the yawing during actual road travel and the disproportionate concentration of a vehicle weight, and testing the performance of an ABS modulator with respect to the weight of diverse vehicles.

2. Description of the Prior Art

Currently, in order to prevent the locking of wheels if a braking system is operated while driving a vehicle, an ABS is mounted to the vehicle, which employs a hydraulic braking system. The locking state denotes that, when a driver suddenly steps on a brake while driving, the rolling motion of the wheels is brought to a halt by the braking system mounted to the respective wheels. At this time, if the inertia force of the vehicle is so large as to exceed a frictional force between the tires and road surface, the vehicle continuously slips along the road in the travelling direction of the vehicle. Due to the slip, the frictional force is further decreased to lengthen the braking distance. In addition to this, since the frictional force is greatly decreased, the vehicle is unable to be steered, regardless of manipulation of a handle thereof, thereby possibly bringing about a disastrous accident.

In the hydraulic braking system, generally, hydraulic pressure produced while using a brake pedal is transmitted from a master cylinder to the wheel cylinders of the respective wheels. The wheel cylinder acts to decelerate the wheel speed or stop the operation of the wheel. With this action, the vehicle is decelerated or stopped. The ABS prevents the locking phenomenon to ensure the stability of straight traveling and the steering performance of the vehicle even in a situation of sudden stoppage by means of automatically controlling the braking pressure of the brake so as to completely achieve braking within the shortest possible distance. For these functions, the ABS is provided with a set of speed sensors for monitoring the speed of respective wheels, and automatically increases, decreases and maintains the hydraulic pressure of the braking in accordance with the monitored speed.

The preferable method for testing the performance of the ABS is to actually mount the ABS to a vehicle and allow the vehicle to actually travel along a road with different surface conditions, as, for instance, a dry surface, a wet surface, a frozen surface, etc. Presently, however, various kinds of vehicles are manufactured and diverse options may be added to a single vehicle type with the consequences of high of costs, manpower and time to effect the performance tests of all the ABSs available on the market with respect to every kind of vehicle.

Owing to the above-described reasons, a testing apparatus capable of testing the performance of an ABS within a narrow space has been developed. For example, U.S. Pat. No. 5,101,660 (issued to La Belle) discloses a dynamometer apparatus for testing two and four wheel drive vehicles under simulated road conditions. Here, the apparatus includes a front roll and a rear roll for engaging the front and rear wheels of the vehicle, an electric motor coupled to each roll, a force transducer and a speed sensor coupled to each roll.

Almost all ABS testing apparatuses described as above are constructed to be furnished with a brake test stand, in which, under the state of mounting the ABS to an actually-used vehicle, respective wheels are placed on a pair of front-wheel driving rollers and a pair of rear-wheel driving rollers allotted to the respective front wheels and rear wheels or on pairs of driving rollers allotted to four wheels, and these pairs of driving rollers are driven to operate the ABS for testing the performance thereof. However, such a testing apparatus cannot simulate Various travelling conditions, e.g., the yawing of the wheels and the disproportionate concentration of the vehicle weight, making it impossible to evaluate accurate performance of the ABS. Otherwise, driving motors are supplied to respective pairs of driving rollers for driving the wheels, thereby increasing installation costs. Furthermore, most of the testing apparatuses are incorporated between the driving motor and pairs of driving rollers, with a sliding-control member, e.g., an electronic clutch, for controlling a sliding characteristic between the wheels and driving roller pairs, which also induces the increase of installation costs.

SUMMARY OF THE INVENTION

It is an object of the present invention to provide a simulator for testing an ABS modulator capable of easily simulating the yawing of a vehicle and the disproportionate concentration of a vehicle weight in accordance with diverse road surface conditions encountered during the actual travel of the vehicle.

To achieve the above object of the present invention, there is provided a simulator for testing an ABS modulator including rotatable opposing first and second flywheels in contact with a pair of wheels by a first predetermined pressure, and a flywheel driving portion which transfers a driving force to the first and second flywheels, and manages (controls the transfer and stoppage of) the driving force with respect to the first and second flywheels and/or the driving force with respect to the second flywheel. Furthermore, wheel rotation-speed sensors monitor the rotational speed of the pair of wheels, and flywheel rotation-speed sensors monitor the rotational speed of the first and second flywheels. A wheel pressing unit respectively installed to the pair of wheels maintains a contact pressure between the wheel and flywheel by the predetermined pressure to allow a frictional force between the wheel and flywheel to concur with a frictional force between a tire and a road surface. A braking system generates a second predetermined pressure equivalent to the pressure induced by a driver's stepping on a brake pedal, generates a braking force corresponding to the second predetermined pressure, transfers the braking force to the wheels, and then mounts a modulator to be tested thereon. A pneumatic pressure generator supplies the second predetermined pressure to the braking system and wheel pressing unit, and a controller electrically connected to the flywheel driving portion, wheel rotation-speed sensors, flywheel rotation-speed sensors, and pneumatic pressure generator, simulates various road surface conditions in accordance with a command, controls the flywheel driving portion to allow the pair of flywheels to have an identical rotational speed or different rotational speeds in response to an input signal from the flywheel rotation-speed sensors, supplies a control signal to the pneumatic pressure generator to provide an identical rotational speed or different rotational speeds to the wheel pressing unit respectively connected to the pair of wheels, and outputs a control signal to the pneumatic pressure generator to operate the braking system.

The flywheel driving portion may comprise a motor for generating the driving force, a driving shaft forming a rotational shaft of the first and second flywheels for transferring the driving force from the motor to the first and second flywheels, first driving force managing means provided on the driving shaft between the motor and first flywheel for managing the transfer of the driving force, and second driving force managing means provided on the driving shaft between the first and second flywheels for managing the transfer of the driving force to the second flywheel.

As to the first and second driving force managing means, an electromagnetic clutch may be employed.

As to the wheel pressing means, pneumatic cylinders may be employed.

As to the rotation-speed sensors, encoders for generating electrical pulses in response to the rotation of the wheels and flywheels may be employed.

The pneumatic pressure generating circuit may comprise a pneumatic pressure generating portion, a braking pressure supply portion for supplying the second predetermined pneumatic pressure to the braking pressure generating means, and first and second pneumatic pressure supply portions for independently supplying the first predetermined pneumatic pressure to the respective wheel pressing means, wherein the first pneumatic pressure supply portions and braking pressure supply portion are respectively formed of a pneumatic regulator for regulating the pneumatic pressure from the pneumatic pressure generating portion in a predetermined level, a flux controller for controlling flux, and a solenoid value connected between the pneumatic regulator and flux controller for switching a path for receiving the pneumatic pressure, and the other of the first and second pneumatic pressure supply portions is formed of a first solenoid valve connected to the pneumatic pressure generating portion for switching the path for receiving the pneumatic pressure, a second solenoid valve connected to the first solenoid valve for switching the pneumatic path of high level or low level, a high-level pneumatic regulator connected to the second solenoid valve for controlling the pneumatic pressure for supplying the pneumatic pressure of high level to the wheel pressing means connected to the other pneumatic supply portion, a low-level pneumatic regulator connected to the second solenoid valve for controlling the pneumatic pressure for supplying the pneumatic pressure of low level to the wheel pressing means connected to the other pneumatic supply portion, a shuttle valve for opening/closing the outputs from the high-level pneumatic regulator and low-level pneumatic regulator, an exhaust solenoid valve for discharging air when the supplied pneumatic pressure is changed from high level to low level, a timer, and a flux controller for controlling flux.

The simulator for testing an ABS modulator according to the invention may further comprise at least one inertia plate detachably fixed to the flywheel to generate the inertia moment identical to the inertia moment of a vehicle weight.

The braking means comprises braking pressure generating means for supplying the pressure equivalent to the pressure caused by the driver's stepping on the brake pedal, a master cylinder for generating a hydraulic pressure for braking the pair of wheels in accordance with the pressure from the braking pressure generating means, and a brake provided to the respective pair of wheels, and the modulator is supplied between the brake and master cylinder.

The braking pressure generating means may be formed of a pneumatic cylinder.

The simulator according to the present invention constructed as above is provided with one driving motor and two electronic clutches to economize installation cost over a conventional testing apparatus including four driving motors and four electronic clutches. Also, by altering the inertia moment of the flywheels and the pressure of the wheels against the flywheels, the yawing of vehicles and the disproportionate concentration of the vehicle weight can be simulated under the various vehicle weight to enable the testing of the ABS modulator by setting diverse road surface conditions.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

Figure 1:
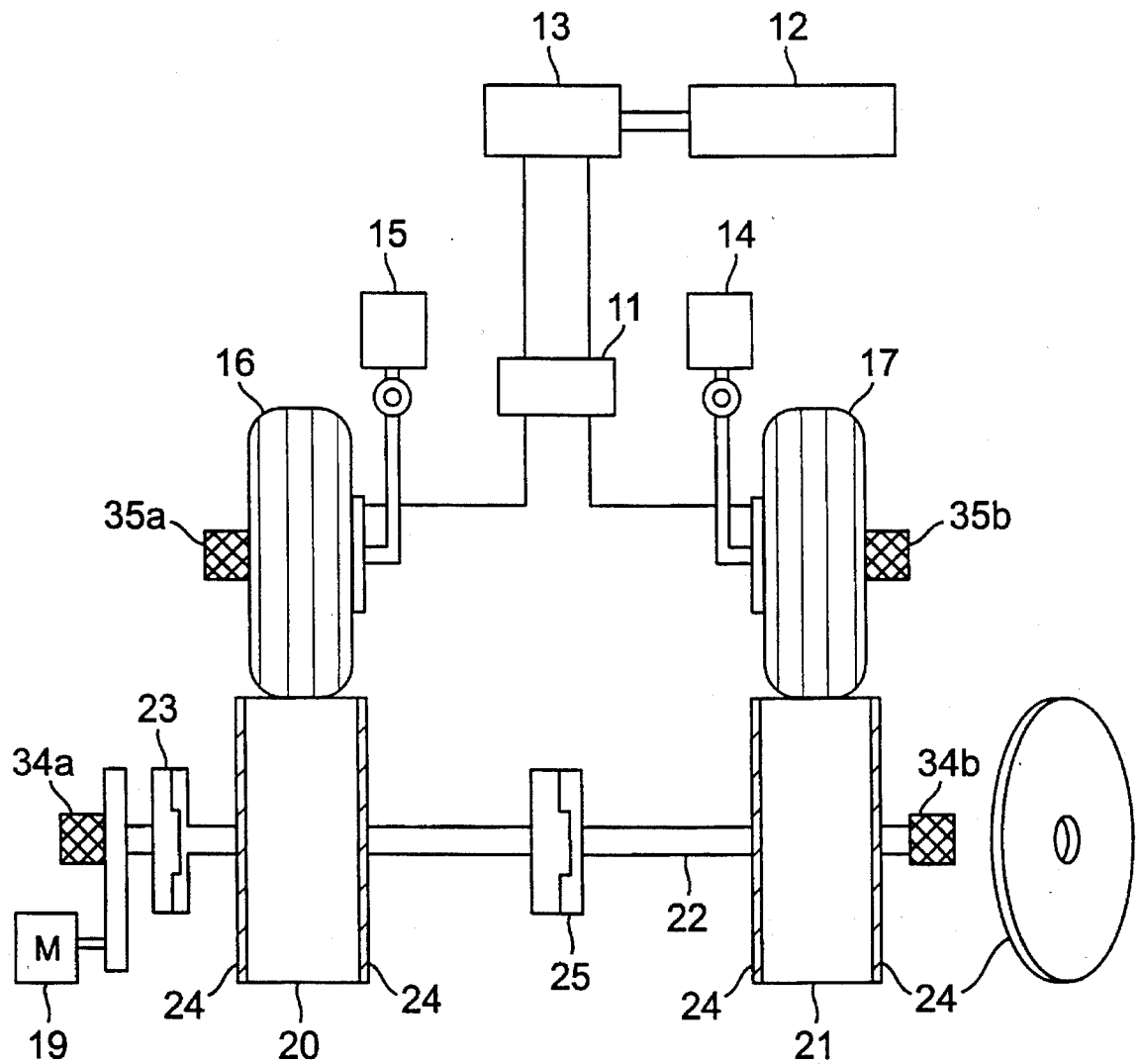
FIG. 1 is a schematic construction view for showing the overall structure of a simulator for testing an ABS modulator according to one embodiment of the present invention.
Figure 2:
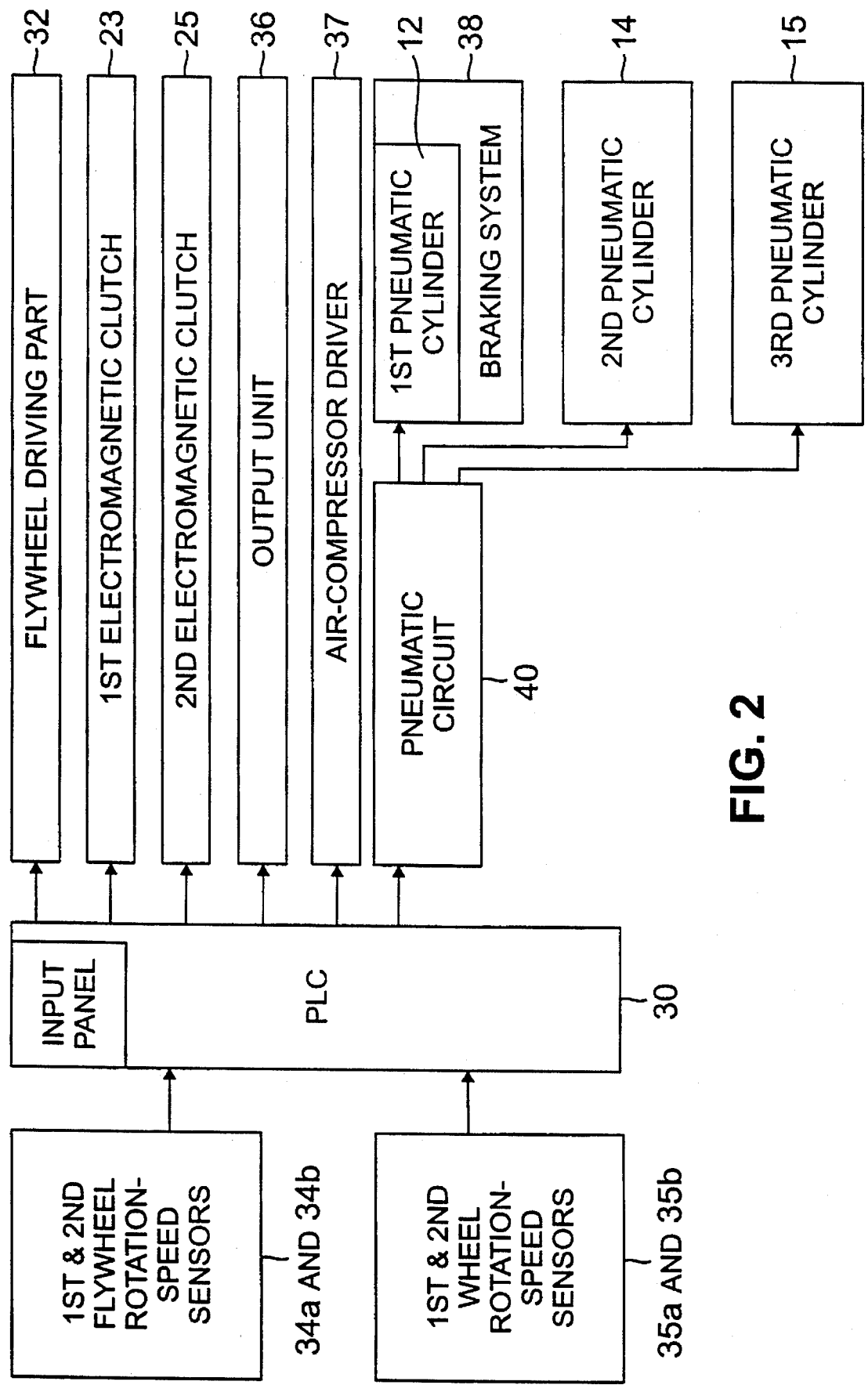
FIG. 2 is a schematic block diagram for showing the simulator of FIG. 1.
Figure 3:
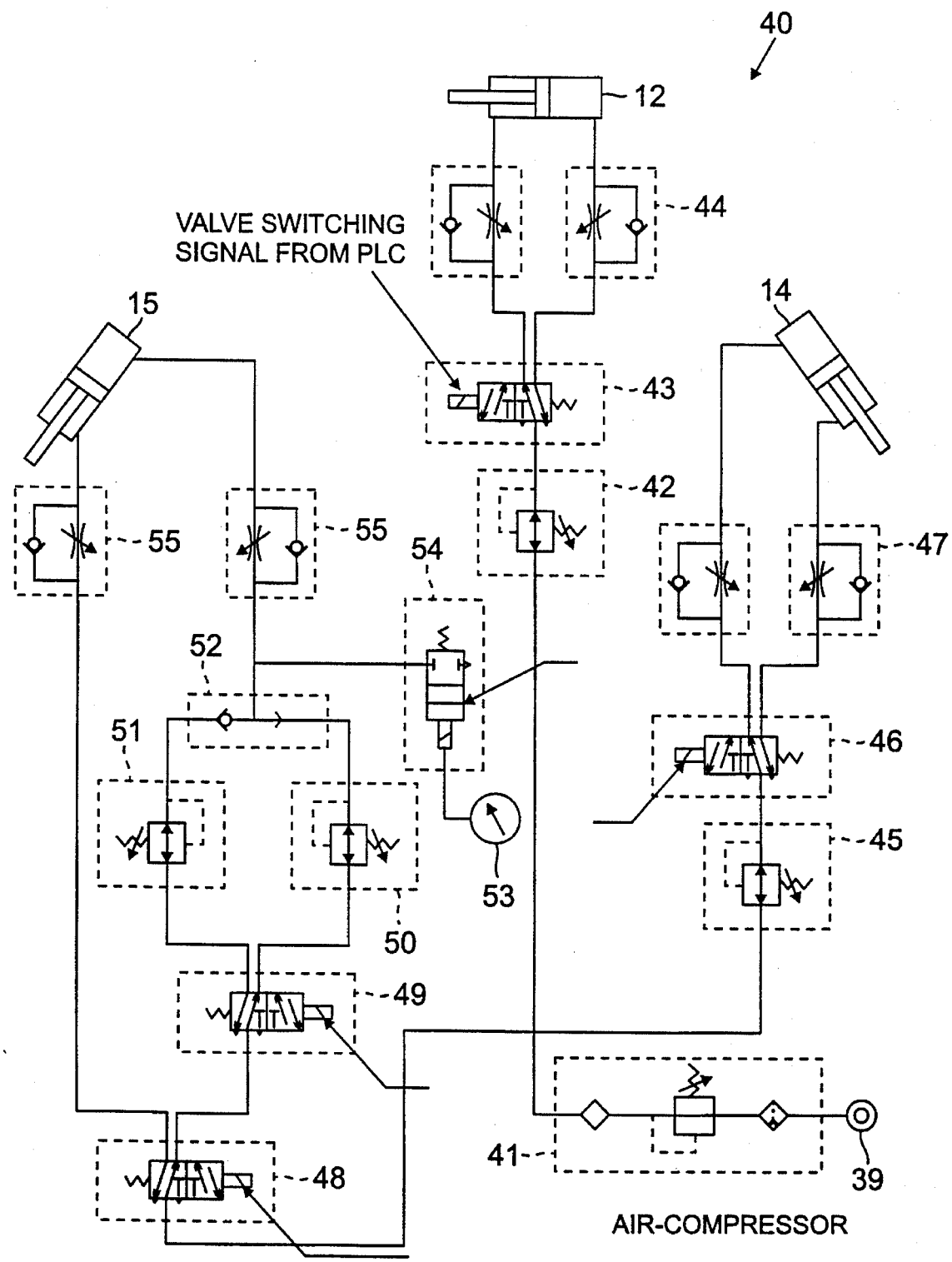
FIG. 3 shows one embodiment of the pneumatic circuit connected to the first, second and third pneumatic cylinders shown in FIGS. 1 and 2.

Referring to FIGS. 1 to 3, a simulator for testing an ABS modulator according to the present invention will be described. As illustrated in the drawings, the simulator according to the present invention includes first and second flywheels 20 and 21 being in rotational contact with a pair of wheels 16 and 17 by a predetermined pressure. First and second flywheels 20 and 21 are provided with a flywheel driving portion for transmitting a driving force to first and second flywheels 20 and 21 and interrupting the driving force with respect to first and second flywheels 20 and 21 and/or second flywheel 21. The flywheel driving portion has an electric motor 19, and a driving shaft 22 for transferring the driving force generated from electric motor 19 to first and second flywheels 20 and 21 while constituting a rotational shaft of first and second flywheels 20 and 21. A first electronic clutch 23 is installed on driving shaft 22 between electric motor 19 and first flywheel 20, and a second electronic clutch 25 for managing the driving force transferred to second flywheel 21 is installed on driving shaft 22 between first and second flywheels 20 and 21.

The simulator according to one embodiment of the present invention includes a braking system 38 which generates a pressure equivalent to pressure by a driver's stepping on a brake pedal, induces a braking force in response to the pressure and transmits the braking force to pair of wheels 16 and 17. The braking system 38 is further provided with a first pneumatic cylinder 12 and a master cylinder 13. A reference numeral 11 denotes an ABS modulator to be tested. ABS modulator 11 is installed between master cylinder 13 of braking system 38 in a vehicle and a wheel cylinder (not shown) attached to pair of wheels 16 and 17 to regulate an hydraulic pressure supplied to braking system 38. A manual braking is performed by directly driving a piston of master cylinder 13 by means of first pneumatic cylinder 12. A pneumatic pressure generated by a pneumatic circuit 40 illustrated in FIG. 3 is partially supplied to first pneumatic cylinder 12. By this pneumatic pressure, the hydraulic pressure to be supplied to braking system 38 is generated from master cylinder 13. The pneumatic pressure is equivalent to the pressure obtained by the driver's stepping on the brake pedal.

The other pneumatic pressure generated by pneumatic circuit 40 is supplied to a second pneumatic cylinder 14 and a third pneumatic cylinder 15 which are wheel pressing apparatus. In order to force the frictional force between pair of wheels 16 and 17 and pair of flywheels 20 and 21 to correspond to the frictional force between a tire and a road surface during actual travelling, the wheel pressing apparatus is provided to pair of wheels 16 and 17 for maintaining a contact pressure between wheels 16 and 17 and pair of flywheels 20 and 21 by a predetermined pressure. Second and third pneumatic cylinders 14 and 15 are mechanically connected to opposing first and second wheels 16 and 17. The pneumatic pressure is set to have a pressure value determined by considering the frictional force between the tire and road surface, which is supplied to first and second wheels 16 and 17. The frictional force generally exerted on the wheel is produced proportional to a frictional coefficient between the wheel and road surface and a perpendicular contact force by the vehicle weight. Thus, in order to apply the frictional force variation in accordance with diverse road surface conditions possibly appearing in the actual situation, the frictional coefficient is not varied but the pressure produced by second and third pneumatic cylinders 14 and 15 are applied to first and second wheels 16 and 17 for varying the perpendicular contact force between first and second wheels 16 and 17 and first and second flywheels 20 and 21 in the simulator according to the present invention. Additionally, the pressure can be differently set to second and third pneumatic cylinders 14 and 15 in the simulator according to the present invention for simulating the circumstances that the disproportionate concentration of the vehicle Weight on one wheel caused while travelling along the uneven road surfaces and curved roads in actual travel of the vehicle.

First and second flywheels 20 and 21 function as travelling surfaces of the vehicle in actual travel, contact with first and second wheels 16 and 17 by a predetermined pressure, and are rotated by the rotation of driving shaft 22 fixed with first and second flywheels 20 and 21. Driving shaft 22 is rotated by electric motor 19. In other words, the rotational force originated from electric motor 19 is transferred to first and second wheels 16 and 17 via driving shaft 22 and first and second flywheels 20 and 21 to rotate first and second wheels 16 and 17. A decelerator may be installed between electric motor 19 and driving shaft 22 for permitting first and second flywheels 20 and 21 to be rotated by a predetermined number of revolution.

To apply the inertia moment of the vehicle varied by the weight and speed of the vehicle during actual travel to the simulator according to the present invention, the-size and weight of first and second flywheels 20 and 21 are determined such that the inertia moment of the flywheel corresponds to the inertia moment of the actual vehicle. Also, at least one inertia plate 24 may be detachably mounted to first and second flywheels 20 and 21 to enable the testing of the ABS modulator with respect to various kinds of vehicles having different weights. At this time, the number of inertia plates to be mounted is determined by considering the inertia moment of the vehicle proportional to the weight of the actual vehicle to which the ABS modulator to be tested is mounted.

First electronic clutch 23 is installed onto driving shaft 22 between electric motor 19 and first flywheel 20, and second electronic clutch 25 is installed onto driving shaft 22 between first and second flywheels 20 and 21. First and second electromagnetic clutches 23 and 25 are under normally connected status to each other to transfer the driving force of electric motor 19 to first and second flywheels 20 and 21. Once the number of revolution of first and second flywheels 20 and 21 reaches a predetermined number of revolution, first electromagnetic clutch 23 is open to initiate the operation of the brake under the state that electric motor 19 and first and second flywheels 20 and 21 are separated. Second electromagnetic clutch 25 serves to manage the driving force from electric motor 19 to independently rotate first and second flywheels 20 and 21.

The simulator according to one embodiment of the present invention is provided with four speed sensors, i.e., first and second flywheel-speed sensors 34a and 34b and first and second wheel-speed sensors 35a and 35b, to independently monitor respective rotational speeds of first and second flywheels 20 and 21 and first and second wheels 16 and 17. Although an encoder is employed in this embodiment, any element such as a tacho-generator capable of detecting the rotational speed may be used.

FIG. 2 is a block diagram of the simulator for testing the ABS modulator shown in FIG. 1. The overall operation of the simulator according to the present invention is controlled by a programmable logic controller (hereinafter referred to as "PLC") 30. An input port of PLC 30 is connected to first and second flywheel-speed sensors 34a and 34b and first and second wheel-speed sensors 35a and 35b, and an output port thereof is connected to a flywheel driving portion 32, first electromagnetic clutch 23, second electromagnetic clutch 25, an output unit 36 and pneumatic circuit 40. FIG. 3 is a detailed circuit diagram of pneumatic circuit 40 shown in FIG. 2.

Referring to FIGS. 2 and 3, the operation of the simulator according to the present invention will be described in detail.

After the ABS modulator to be tested is connected between master cylinder 13 and their wheel cylinder of the simulator according to the embodiment, electric power is supplied to the simulator. Then, the test conditions, e.g., set values of the rotational speed of first and second flywheels 20 and 21, the braking pressure produced by first pneumatic cylinder 12 for driving master cylinder 13 and the pneumatic pressure of second and third pneumatic cylinders 14 and 15, are supplied via the input panel of PLC 30. Thereafter, inertia plate 24 in proper numbers is mounted to the flywheel to force the inertia moment of the vehicle created by the weight of the vehicle to which the ABS modulator is actually mounted to concur with the inertia moment of first and second flywheels 20 and 21.

An air-compressor driving signal from PLC 30 is supplied into an air-compressor driver 37 to drive an air compressor 39 which can be automatically driven by PLC 30, or manually driven as required. After driving air compressor 39, a valve switching signal is supplied from PLC 30 to second, third and fourth solenoid valves 46,48 and 49 to switch them, so that the pneumatic pressure produced from air compressor 39 is transferred to second and third pneumatic cylinders 14 and 15. By the pneumatic pressure transferred to second and third pneumatic cylinders 14 and 15, first and second flywheels 20 and 21, and first and second wheels 16 and 17 become in contact with one another with a predetermined contact pressure.

In order to simulate the disproportionate concentration of the vehicle weight occurring when the vehicle moves along uneven portions of road or travels a curved road, the simulator according to the present invention may supply the pneumatic pressure of a low level lower than that of second pneumatic cylinder 14 to third pneumatic cylinder 15. For this operation, under the state that a predetermined pneumatic pressure is supplied to third and fourth solenoid valves 48 and 49 as described above, the valve switching signal transferred from PLC 30 to third and fourth solenoid valves 48 and 49 is turned off, and the valve switching signal is output to an exhaust solenoid valve 54. By doing so, air is discharged via exhaust solenoid value 54 during the time preset by a timer 53 to change the pneumatic pressure of third pneumatic cylinder 13 from the high level to low level.

An electric-motor driving signal from PLC 30 is supplied into flywheel driving portion 32 to rotate electric motor 19 shown in FIG. 1. Upon the rotation of electric motor 19, driving shaft 22, first and second flywheels 20 and 21 operatively connected to electric motor 19 are rotated to rotate first and second wheels 16 and 17 contacting first and second flywheels 20 and 21 with a predetermined contact pressure.

If the rotational speed of first and second flywheels 20 and 21 monitored by flywheel-speed sensor 34 reaches a predetermined value, a first clutch separation signal is output from PLC 30 to first electromagnetic clutch 23 to shift first electromagnetic clutch 23 from the connection state to the separation state.

For the purpose of simulating the situation that, in actual travel, one wheel of the vehicle contacts the road with the freezing or wet surface having a different frictional coefficient from that of the other wheel, the rotational speed of respective first and second flywheels 20 and 21 may be independently set in the simulator according to the present invention. In this case, when the rotational speed of first and second flywheels 20 and 21 reaches a second rotational speed slower than a first rotational speed, second electromagnetic clutch 25 is primarily shifted to the separation state by a second clutch separation signal from PLC 30. After this, when the rotational speed of first flywheel 20 reaches to the first rotational speed, first electromagnetic clutch 23 is shifted to the separation state by the first clutch separation signal from PLC 30. With this operation, the driving force from electric motor 19 is not transmitted to driving shaft 22, and, under this circumstance, braking system 38 begins to operate.

The braking pressure equivalent to pressure with which a driver manipulates the brake pedal is generated from first pneumatic cylinder 12 and directly supplied to the piston of master cylinder 13, thereby operating braking system 38. More specifically, once the valve switching signal is output from PLC 30 to first solenoid valve 43 to switch first solenoid valve 43, the pneumatic pressure of a predetermined pressure is provided to first pneumatic cylinder 12. With the pneumatic pressure supplied to first pneumatic cylinder 12, the braking pressure is transferred to master cylinder 13 to operate braking system 38. The magnitude of the braking pressure is regulated by a second pneumatic regulator 42 by a certain pressure. The time taken for elevating the braking pressure results from the time required for operating first solenoid valve 43 and the time delay required until the pressure is formed within first pneumatic cylinder 12. This braking pressure rising time corresponds to the time delay until the driver steps on the brake pedal in an actual situation.

Braking system 38, like a general ABS-mounted braking system, includes a brake consisting of master cylinder 13, ABS modulator 11, the wheel cylinder, a brake disc and a friction pad. The braking pressure in response to the actual manipulation of the brake pedal of the vehicle is generated from first pneumatic cylinder 12 and supplied to master cylinder 13, and the hydraulic pressure from master cylinder 13 is supplied to the wheel cylinder via ABS modulator 11, so that the wheel cylinder presses the friction pad toward the brake disc to effect the braking.

To analyze the operational performance of ABS modulator 11 while braking, predetermined data such as the speed of first and second wheels 16 and 17 monitored by first and second wheel-speed sensors 35a and 35b, speed of first and second flywheels 20 and 21 corresponding to the vehicle speed monitored by first and second flywheel-speed sensors 34a and 34b, pressure of brake calipers, and pressure of the master cylinder 13 is supplied to a display unit or output unit 36 which is the printing means. At this time, the predetermined data is input to a computer via an interface to carry out data processing, output and the like.

Referring to FIG. 3, the operation braking system 38 will be described in detail. As described above, pneumatic circuit 40 functions as means affording the predetermined braking pressure to master cylinder 13 in accordance with a control signal of PLC 30, and providing the perpendicular contact force of first and second wheels 16 and 17 against first and second flywheels 20 and 21.

As shown in the drawing, the pneumatic pressure from air compressor 39 passes through a first pneumatic regulator 41 prior to being supplied to first pneumatic cylinder 12 via second pneumatic regulator 42, first solenoid valve 43 and a flux controller 44 to produce the hydraulic pressure to master cylinder 13 shown in FIG. 1 which is connected to the piston of first pneumatic cylinder 12, thereby accomplishing the braking.

The pneumatic pressure from first pneumatic regulator 41 is also supplied to second pneumatic cylinder 14 vie a third pneumatic regulator 45, second solenoid valve 46 and a flux controller 47. Therefore, the perpendicular contact force equivalent to the frictional force of the wheel and ground surface during the actual travelling is generated between wheel 17 and flywheel 21.

Meantime, for the purpose of simulating a situation in that the vehicle weight disproportionately concentrates on one wheel when the vehicle actually moves along the uneven portion of the road or curved road, it is necessary to supply a pneumatic pressure different from that of second pneumatic cylinder 14 to third pneumatic cylinder 15. In more detail, when vehicle weight is proportionately placed, to provide the pneumatic pressure of a high level identical to that of second pneumatic cylinder 14 to third pneumatic cylinder 15, the pneumatic pressure from first pneumatic regulator 41 is supplied to third pneumatic regulator 15 via third solenoid valve 48, fourth solenoid valve 49, a fourth pneumatic regulator 50 for regulating the pneumatic pressure to high level, a shuttle valve 52 for selectively opening/closing an output side path of fourth and fifth pneumatic regulators 50 and 51, and a flux controller 55. For simulating a situation in that the vehicle weight disproportionately concentrates on second wheel 17, the pneumatic pressure of a low level lower than that of second pneumatic cylinder 14 should be supplied to third pneumatic cylinder 15. For this operation, the valve switching signal from PLC 30 to third and fourth solenoid valves 48 and 49 is turned off to shift the valve position of third and fourth solenoid valves 48 and 49. Following this operation, the pneumatic pressure from first pneumatic regulator 41 is supplied to fifth regulator 51 for regulating the pneumatic pressure to the low level, and exhaust solenoid valve 54 is open for the time set by timer 53, so that the pneumatic pressure of the low level lower than that supplied to second pneumatic cylinder 14 is provided to third pneumatic cylinder 15. Consequently, the braking performance of ABS modulator 11 can be analyzed with respect to the situations in which the vehicle weight disproportionately or proportionately concentrates on one wheel.

On the other hand, the pneumatic circuit utilized in the simulator according to the present invention is not limited to the pneumatic circuit shown in FIG. 3, but any one type capable of performing the above-stated operation may be applied.

The simulator according to the present invention including a single driving motor and two electromagnetic clutches can reduce installation costs as compared with the conventional testing apparatus which has four driving motors and four electromagnetic clutches. In addition, the inertia moment of the flywheel is variable by means of the proper number of inertia plates, enabling the performance testing of the ABS with respect to diverse kinds of vehicles. Moreover, since the second and third pneumatic cylinders are employed to identically or differently set the pressure supplied to the pair of flywheels corresponding to the pair of wheels, the yawing of the vehicle and disproportionate concentration of the vehicle weight can be simulated. As a result, the ABS modulator can be tested by setting various road surface conditions to facilitate the comparison of the objective performance with respect to various ABSs available on the market.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A simulator for testing an anti-lock brake system modulator comprising:

rotatable first and second flywheels in contact with a pair of wheels by a predetermined pressure, the first and second flywheels being spaced a distance from each other;

a flywheel driving portion for transmitting a driving force to said first and second flywheels, and managing the driving force with respect to said first and second flywheels and/or the driving force with respect to said second flywheel;

wheel rotation-speed sensors for monitoring the rotational speed of said pair of wheels;

flywheel rotation-speed sensors for monitoring the rotational speed of said first and second flywheels;

wheel pressing means respectively installed to said pair of wheels for maintaining a contact pressure between said wheel and flywheel by a predetermined pressure to allow a frictional force between said wheel and flywheel to concur with a frictional force between a tire and a road surface;

braking means for generating a second predetermined pressure equivalent to a pressure induced by a driver's stepping on a brake pedal, generating a braking force corresponding to said pressure, transferring said braking force to said wheels, and mounting a modulator to be tested;

a pneumatic pressure generating circuit part for supplying the second predetermined pressure to said braking means and wheel pressing means; and controlling means electrically connected to said flywheel driving portion, wheel rotation-speed sensors, flywheel rotation-speed sensors, and pneumatic pressure generating circuit part for simulating various road surface conditions in accordance with a command, controlling said flywheel driving portion to allow said pair of flywheels to have an identical rotational speed or different rotational speeds in response to an input signal from said flywheel rotation-speed sensors, supplying a control signal to said pneumatic pressure generating circuit part to provide an identical rotational speed or different rotational speeds to said wheel pressing means respectively connected to said pair of wheels, and outputting a control signal to said pneumatic pressure generating circuit part to operate said braking means, wherein the pneumatic pressure generating circuit part comprises a pneumatic pressure generating portion, a braking pressure supply portion for supplying the second predetermined pneumatic pressure to the braking pressure generating means, and first and second pneumatic pressure supply portions for independently supplying the first predetermined pneumatic pressure to respective wheel pressing means, wherein one of said first and second pneumatic pressure supply portions and braking pressure supply portion are respectively formed of a pneumatic regulator for regulating the pneumatic pressure from said pneumatic pressure generating portion in a predetermined level, a flux controller for controlling flux, and a solenoid value connected between the pneumatic regulator and flux controller for switching a path for receiving the pneumatic pressure, and the other of said first and second pneumatic pressure supply portions is formed of a first solenoid valve connected to the pneumatic pressure generating portion for switching the path for receiving the pneumatic pressure, a second solenoid valve connected to the first solenoid valve for switching the pneumatic path of high level or low level, a high-level pneumatic regulator connected to the second solenoid valve for controlling the pneumatic pressure for supplying the pneumatic pressure of high level to the wheel pressing means connected to the other pneumatic supply portion a low-level pneumatic regulator connected to the second solenoid value for controlling the pneumatic pressure for supplying the pneumatic pressure of low level to the wheel pressing means connected to the other pneumatic supply portion, a shuttle valve for opening/closing the outputs from the high-level pneumatic regulator and low-level pneumatic regulator, an exhaust solenoid valve for discharging air when the supplied pneumatic pressure is changed from high level to low level, a timer, and a flux controller for controlling flux.

2. A simulator for testing an anti-lock braking system modulator as claimed in claim 1, wherein said flywheel driving portion comprises:

a motor for generating the driving force;

a driving shaft for forming a rotational shaft of said first and second flywheels and for transferring said driving force from said motor to said first and second flywheels;

first driving force managing means provided on said driving shaft between said motor and first flywheel for managing the transfer of said driving force; and second driving force managing means provided on said driving shaft between said first and second flywheels for managing the transfer of said driving force to said second flywheel.

3. A simulator for testing an anti-lock braking system modulator as claimed in claim 2, wherein said first and second driving force managing means include electromagnetic clutches.

4. A simulator for testing an anti-lock braking system modulator as claimed in claim 1, wherein said wheel pressing means includes pneumatic cylinders.

5. A simulator for testing an anti-lock braking system modulator as claimed in claim 1, wherein the rotation-speed sensors include encoders for generating electrical pulses in response to the rotation of said wheels and flywheels.

6. A simulator for testing an anti-lock braking system modulator as claimed in claim 1, further comprising at least one inertia plate detachably fixed to said flywheel to generate the inertia moment identical to the inertia moment of a vehicle weight.

7. A simulator for testing an anti-lock braking system modulator as claimed in claim 1, wherein said braking means comprises braking pressure generating means for supplying said pressure equivalent to said pressure caused by said driver's stepping on said brake pedal, a master cylinder for generating an hydraulic pressure for braking said pair of wheels in accordance with said pressure from said braking pressure generating means, and a brake provided to respective pair of wheels, and said modulator is supplied between said brake and master cylinder.

8. A simulator for testing an anti-lock braking system modulator as claimed in claim 7, wherein said braking pressure generating means includes a pneumatic cylinder.

\* \* \* \* \*